Aug. 7, 1951     W. P. OEHLER ET AL     2,563,186
CAM RELEASED CLUTCH
Original Filed Sept. 19, 1945
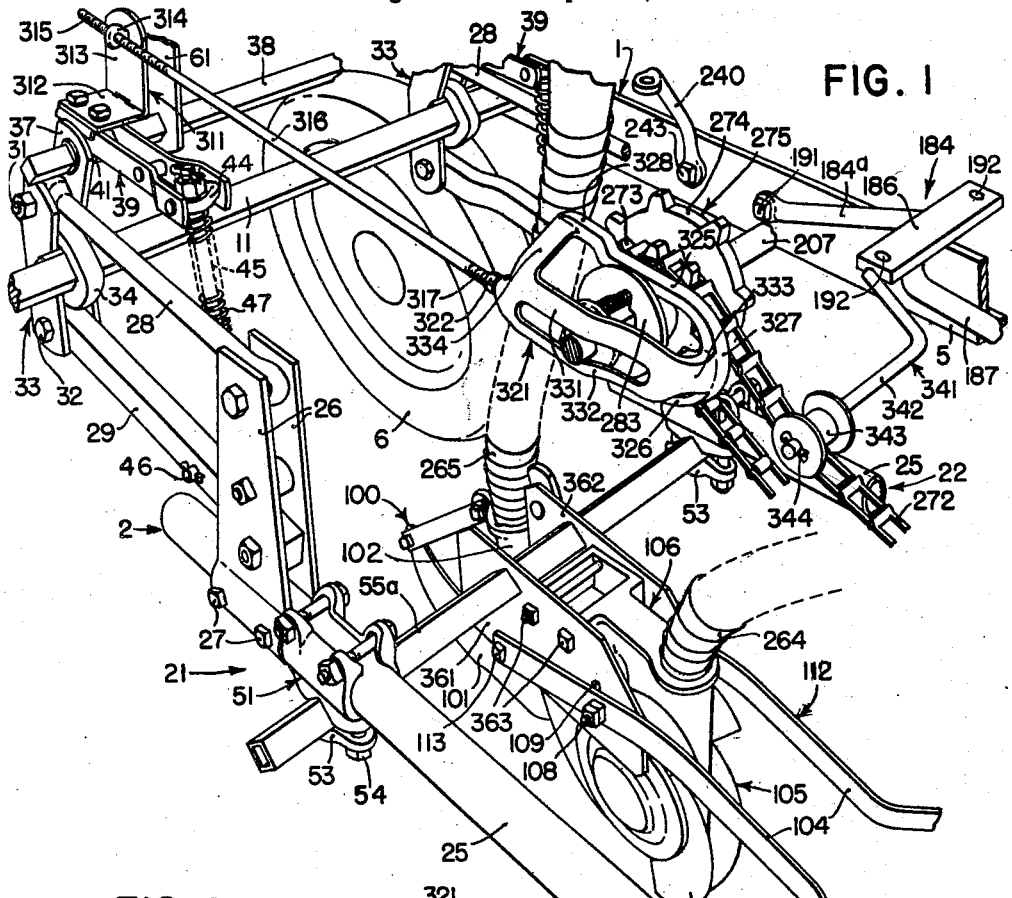
FIG. 1
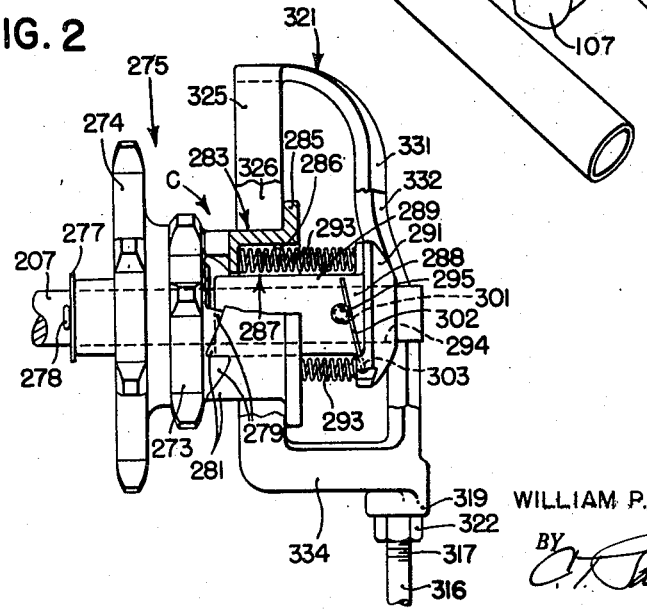
FIG. 2
INVENTORS
WILLIAM P. OEHLER &
GUY W. ADE
ATTORNEYS.

Patented Aug. 7, 1951

2,563,186

UNITED STATES PATENT OFFICE 2,563,186

CAM RELEASED CLUTCH

William P. Oehler and Guy W. Ade, Moline, Ill., assignors to Deere & Company, Moline, Ill., a corporation of Illinois Original application September 19, 1945, Serial No. 617,238. Divided and this application July 22, 1947, Serial No. 762,702

7 Claims. (Cl. 192—67)

1

This application is a division of our co-pending patent application, Serial No. 617,238, filed September 19, 1945.

The present invention relates generally to agricultural implements and more particularly to implements for planting and fertilizing.

The object and general nature of the present invention is the provision of a new and improved planting and fertilizer attachment particularly adapted for mounting on a tractor equipped with cultivating tools. More specifically, an important feature of this invention is the provision of new and improved controlling mechanism for the planting and fertilizing units and new and improved means whereby the dispensing of the seed and fertilizer is controlled by the cultivator raising and lowering mechanism which is connected to raise and lower the planting and fertilizing furrow openers. It is also a feature of this invention to provide new and improved means associated with the cultivator rigs, particularly the raising and lowering mechanism therefor, whereby the planting and fertilizing furrow openers are raised automatically.

These and other objects and advantages of the present invention will be apparent to those skilled in the art after a consideration of the following detailed description of the preferred form in which the principles of the present invention have been incorporated and which are illustrated in the accompanying drawings.

In the drawings:

Figure 1 is a perspective view of a tractor cultivator with which is associated planting and fertilizing attachments incorporating the principles of the present invention.

Figure 2 is an enlarged detail of the throwout clutch.

Referring first to Figure 1, the new and improved planter and fertilizer attachments with which the present invention is more particularly concerned is shown as mounted on a farm tractor 1 on which right and left hand cultivator attachments 2 are mounted. These cultivator attachments are, in general, identical and therefore corresponding parts of the right and left hand units will be indicated by the same reference numerals. The same is true of the planter and fertilizer attachments. The tractor 1 is largely conventional, embodying right and left hand frame bars 5 supported at their front ends on front steering wheels 6 and connected at their rear ends with the motor and transmission unit to which right and left hand axle housings are connected. A rear axle shaft is supported for rotation in each

2 of the axle housings. Each of the cultivator attachments 2 includes a laterally outwardly extending draft bar 11 formed with or attached to an attaching plate at its inner end by which the draft bar may be fixed to the side of the tractor. Each draft bar 11 receives a pair of cultivator rigs indicated generally at 21 and 22. Each rig includes a rig beam 25 to the forward end of which a pair of standards 26 are fixed, as by bolts 27. The standards 26 are apertured to receive bolts or pins which pivotally connect to the standards the rear ends of a pair of upper and lower links 28 and 29 which, at their forward ends are pivoted, as at 31 and 32, to an attaching bracket 33 which is clamped to the draft bar 11 by any suitable means, such as a U-bolt 34. Each of the brackets 33 is extended upwardly, as at 37, and is apertured to receive suitable bearing means supporting a rockshaft 38 on the draft bar 11. A pair of lifting arms 39 is fixed to the rockshaft 38 by any suitable means, such as a U-bolt 41, and the outer end of each lifting arm 39 carries a swivel 44 through which a lifting rod 45 extends. The lower end of each lifting rod 45 is bent laterally, as at 46, and inserted through an opening in the lower link 29. A compression spring 47 is disposed between each swivel 44 and an abutment collar or the like fixed to the lower portion of the associated lifting link 45.

A clamp casting 51 is fixed to the front end of each cultivator rig beam 25, rearwardly of the standards 26 secured thereto, and each member 51 includes a lower clamping cap 53 and associated bolt means 54 which secure a spread bar 55a to the cultivator rig beams 25. The spread bar 55a thus holds the two cultivator rig beams 25 rigidly together so that they are raised and lowered simultaneously whenever the rockshaft 38 is rocked. Each of the rockshafts 38 carries an upwardly extending arm 61, preferably welded thereto, each arm 61 being apertured to receive suitable means connecting the front end of a longitudinally extending lift member thereto. The lift member at each side of the tractor is actuated in any suitable manner and is shifted generally longitudianlly to raise the tools, as in a conventional tractor mounted cultivator.

As mentioned above, and as shown in Figure 1, the clamps 51 are mounted on the cultivator rig beams 25 rearwardly of the standards 26 and the spread bar 55a has a pair of mounting or supporting plates 361 and 362 welded or otherwise permanently fixed thereto in laterally spaced apart relation. A fertilizer furrow opener 100 having a furrow opener runner 101 and a fertilizer boot 102 is bolted to the inner plate 362 and receives fertilizer from a fertilizer tube 265. Between the two mounting plates 361 and 362 is a seeding unit 105, comprising a suitable seed boot and support 106 bolted between the adjacent portions of the plates 361 and 362 and provided with a double disk seed furrow opener 107. A pair of press wheels is mounted in a press wheel frame 112 which is made up of bars 104 pivoted at 113 to the plates 361 and 362. The press wheel frame 112 may float free, or it may be fixed to the plates 361 and 362, as by tightening locking bolts 108 which extend through slots 109 in the plates 361 and 362. The double disk furrow opener 107 is of the variable depth type, and the supporting casting 106 receives the lower end of a seed tube 264. Normally, the furrow opener 107 is disposed substantially midway between the two ring beams 25 while the fertilizer furrow opener 101 is disposed slightly to one side of the center line. The seed furrow opener unit 105 is secured in place between the spaced apart plates 361 and 362 by bolts 363 or the like. In this form of the invention, it is a very simple matter to attach and remove the planting and fertilizing unit merely by loosening the caps 53, sliding the spread bar 55a to one side until one end clears the clamp 51, and then shifting the entire unit in the other direction until it is clear of the other clamp.

For selecting and dispensing seed and fertilizer for delivery to the furrow opener units 100 and 105, there are provided seed and fertilizer hoppers at the side of the tractor, as shown in more detail in our parent application identified above. Briefly, each seed hopper is supported on a mounting bracket 184 which comprises a platform or base member 186 extending generally laterally with respect to the tractor and having an outer brace 187 which is fixed to the member 186 at its upper end and at its lower end is secured to the frame 5 of the tractor. A second brace 184a is secured at its upper end to the inner end of the base member 186, the member 184a extending downwardly, forwardly and inwardly and bolted, as at 191, to the frame 5 of the tractor. The base member 186 is apertured, as at 192, to receive bolts by which a seed hopper bottom is secured to the member 186. The base member 186 receives the seed hopper, and the fertilizer hopper is mounted partly on the seed hopper and partly on the single outer support 240 which is bolted at 243 to the frame 5 of the tractor. The fertilizer hopper may readily be attached or detached merely by loosening the support 240 to permit the outer part of the hopper bottom to be swung downwardly to a point sufficient to be disconnected from the seed hopper, as explained in more detail in our parent application.

As mentioned above, at each side of the tractor there is mounted a unit including a seed hopper and a fertilizer hopper, the seeding mechanism being actuated by the shaft 207 and associated parts, which also drives the fertilizer dispensing mechanism, both seeding and fertilizing mechanisms thus being driven from the shaft 207. Each shaft 207 is driven from the tractor rear axle at that side of the tractor by a sprocket and chain construction, including throwout clutch means C which will now be described, and which forms the principal subject matter of the present invention.

Mounted on each tractor axle shaft is a sprocket over which a sprocket chain 272 is trained. At its forward end the chain 272 is trained over one or the other of the two sprocket sections 273 and 274 making up a compound sprocket member 275. The member 275 is rotatable on the shaft 207 and is prevented from being displaced axially inwardly by means of a washer 277 and a cotter 278, as shown in Figure 2. The member 275 is formed at its outer face with a plurality of clutch teeth 279 which are adapted to cooperate with corresponding clutch teeth 281 formed on a clutch member 283 that is non-rotatably connected with the shaft 207. The clutch member 283 is provided at its outer side with a radial flange 285 and also with a plurality of spring-receiving recesses 286 disposed generally about a central opening 287 formed in the member 283. The opening 287 preferably is square in section and is adapted to receive the squared portion 288 of a companion cam-receiving abutment member 289 having at its outer end a rounded head portion 291 which is of larger diameter than the portion 288. A plurality of springs 293 is disposed between the head 291 and the clutch member 283, the springs 293 seating respectively in the spring-receiving openings or sockets 286. The member 289 is provided with a through opening 294 which receives the shaft 207, and a pin 295 is inserted through openings in the member 289 and through an opening in the outer end portion of the shaft 207. The outer end of the pin 295 is provided with an annular groove 301 into which a spring wire 302 is adapted to seat. The spring wire 302 has a flattened end 303 so that when the wire 302 is forced into an opening formed in the head 291, the spring wire 302 is held in place therein and yieldingly holds the pin 295 against accidental displacement. However, when it is desired to detach the clutch parts it is a simple matter to move the wire 302 out of the groove 301 and take out the pin 295, after which all of the clutch parts, including the sprockets 273 and 274, may be removed from the drive shaft 207.

The clutch C is controlled by a connection with the lifting rockshaft 38. Referring now to Figure 1, an arm 311 is provided with an apertured base section 312 which connects the same fixedly to the arm 39 by the same U-bolt 41 that fastens the outer lift arm 39 to the rockshaft 38. The arm 311 is provided with an apertured outer extension 313 which is apertured to receive a pivot pin 314. The latter is tapped and receives the threaded portion 315 of a connecting rod or link 316, the rear end of which is also threaded, as at 317, and is screwed into a tapped boss section 319 carried by a clutch controlling cam member 321. A lock nut 322 serves to secure the connection between the link 316 and the cam member 321.

The clutch controlling cam member 321 is of particular construction. The cam member 321 includes a cage-like structure having a pair of inner bars 325 and 326 which are interconnected by a rounded section 327 at their rear ends and spaced apart at their forward ends and offset in a generally vertical direction, as indicated at 328. A pair of cam sections 331 and 332 in the form of generally longitudinally extending bars are joined together and with the rounded portion 327 of the inner bars 325 and 326 by a connecting section 333. At their forward ends the cam bars 331 and 332 are connected together and to the offset upper and lower portions 328 by means of brace sections 334, this being the part of the member 321 that is tapped to receive the rear end of the link 316.

The inner surfaces of the bars 331 and 332 are shaped to lie against the rounded head portion 291 of the member 289 that is fixed to the shaft 207 while the inner bars 325 and 326 lie against the laterally inner face of the clutch flange 285. It will be seen, particularly from Figure 2 that when the clutch member 321 is drawn forwardly, the rear or laterally inwardly offset portions of the bars 331 and 332 will act against the rounded head section 291 to cause the bars 325 and 326 to draw the clutch member 283 laterally outwardly against the action of the springs 293 so as to disengage the teeth 281 from the teeth 279 on the sprocket member 275, thus interrupting the drive between the member 275 and the shaft 207 which drives the seeding and fertilizer mechanisms, as described above. The cam member 321 is drawn forwardly, as just described, by the link 316 whenever the rockshaft 38 is actuated to raise the tools by swinging upwardly on the lift arms 39. The control member, such as the arm 311, may of course be mounted below, above, or rearwardly of the shaft 207 and operate the part 321 to engage or disengage the clutch C in the manner just described.

The cam member 321 may readily be disengaged by removing the pin 314 from the arm 313 and then shifting the cam member 321 rearwardly until the spaced apart portions 328 will clear the flange 285. After the cam member 321 has thus been disconnected, the pin 295 may be removed and the other parts disassembled. If desired, of course, the pin 295 may be removed without disconnecting the clutch control member 321. In either event, the clutch parts are readily removable to permit the easy substitution of other sprockets for the sprockets 273 and 274, permitting a change in the rate of rotation of the shaft 207, since almost any size of sprockets may be mounted on the shaft 207 in the position of the member 275 because there is no adjacent structure which, as a practical proposition, limits the size of sprocket that can be used at this point.

In order to keep the chain 272 tight an arm 341 is pivotally mounted on the seed hopper bottom. Preferably, the arm 341 includes a laterally outwardly directed section 342 on which a chain-engaging roller 343 is mounted, preferably being held against displacement thereon by cotters 344.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In an agricultural machine, a shaft to be driven, a sprocket loosely mounted on said shaft but held against axial displacement relative thereto in one direction, means for driving said sprocket, a polygonal member mounted on said shaft, detachable means non-rotatably connecting said polygonal member with said shaft, a clutch member mounted on said polygonal member and shiftable axially relative thereto, clutch teeth formed on said axially shiftable clutch member, said shaft extending through said clutch member, a cam member mounted for translation relative to said shaft and having means engageable with said axially shiftable clutch member for shifting the same axially, said shaft extending through said cam member, said polygonal member and said axially shiftable clutch member having cooperating means for non-rotatably connecting said members, and said cam member having portions engaging said polygonal member and said axially shiftable member for controlling the position of the latter.

2. In an agricultural machine, a shaft to be driven, a sprocket loosely mounted on said shaft but held against axial displacement relative thereto in one direction, means for driving said sprocket, a polygonal member mounted on said shaft, a clutch member mounted on said polygonal member and shiftable axially relative thereto, clutch teeth formed on said axially shiftable clutch member, said shaft extending through said clutch member, a cam member mounted for translation relative to said shaft and having means engageable with said axially shiftable clutch member for shifting the same axially, said shaft extending through said cam member, said polygonal member and said axially shiftable clutch member having cooperating means for non-rotatably connecting said members, and said cam member having portions engaging said polygonal member and said axially shiftable member for controlling the position of the latter, and means releasably connecting said polygonal member with said shaft, disconnecting said polygonal member accommodating the removal of said cam member and said sprocket and clutch members to provide for the substitution of a sprocket member at different sides so as to vary the drive ratio.

3. In a clutch for agricultural implements having a drive member and a driven shaft, a non-circular part fixed to said shaft to rotate therewith and to be held against axial movement relative thereto, a clutch member having a non-circular bore slidable on said part and mounted thereon for axial movement toward and away from said drive member and constrained to rotate with said part and shaft, spring means acting between said part and said clutch member for moving the latter toward said drive member, a cam member shiftable transversely relative to said shaft and having a slot through which said shaft extends and clutch-operating cam sections embraceably engaging said part and said shiftable clutch member on opposite sides of said shaft for moving said clutch member toward the end of said part opposite said drive member and therefore out of engagement with the latter, and means for shifting said cam member.

4. In a clutch for agricultural implements having a driven shaft, a drive member mounted for free rotation on said shaft, an abutment on said shaft to limit axial movement of said drive member in one direction, a sleeve-like member having a non-circular exterior surface fixed to said shaft at the other side of said drive member and limiting axial movement thereof in the other direction, a clutch member shiftable axially along said sleeve-like member into and out of clutching engagement with said drive member, said axially shiftable clutch member having a non-circular opening and fitting over said sleeve-like member so as to rotate with the latter, biasing means acting against said clutch member to shift the latter toward said drive member, and a cam member acting between said sleeve-like member and said clutch member for shifting the latter out of clutching engagement with said drive member.

5. The invention set forth in claim 4, further characterized by means detachably connecting said sleeve-like member with said shaft, the detaching of said sleeve-like member providing for the dismounting of said cam member, drive member, and clutch member from said shaft.

6. In an agricultural implement including a shaft to be driven: clutch mechanism for controlling the driving of said shaft, comprising a part adapted to be fixed to said driven shaft, a driving member adapted to be journaled for rotation on said driven shaft, said driving member being mounted for rotation relative to said shaft adjacent one end of said part and having a clutching section, abutment means carried by said shaft and acting against said driving member to prevent the latter from moving axially along said shaft away from said part, an axially shiftable clutch member having a clutching section adapted to operatively engage the clutching section on said driving member, means for mounting said shiftable clutch member non-rotatably on said shaft but accommodating axial movement of said clutch member along said shaft, said clutch member being disposed between said driving member and said part and said clutch member having a flange, a cam member having cam sections engageable, respectively, with said flange and said part, said cam sections acting against said part to draw the clutch member axially of said shaft toward said part and out of engagement with said driving member, whereby the latter rotates freely on said shaft when the clutch mechanism is disengaged, and means for supporting said cam member on said shaft.

7. In a clutch for agricultural implements having a driven shaft, a driving member rotatably mounted on said shaft and including a clutch section, a clutch member having a clutch section and non-rotatably connected with and mounted for axial movement on said shaft, spring means biasing said clutch member for movement in one direction along said shaft toward the clutch section on said driving member, an abutment on said shaft adjacent said shiftable clutch member and spaced therefrom on the side thereof opposite said driving member, spring means acting against said abutment and said shiftable clutch member for moving the clutch section thereof into engagement with the clutch section of the driving member, a cam member shiftable transversely relative to said shaft and having converging cam sections engageable embraceably on opposite sides of said abutment and said shiftable clutch member on opposite sides of said shaft, and means for supporting said cam member for transverse movement on said clutch member and said shaft adjacent said abutment, so as to cause transverse movement of said converging cam sections to act against said abutment and move said shiftable clutch member toward said abutment and away from the clutch section on said driving member.

WILLIAM P. OEHLER.
GUY W. ADE.

REFERENCES CITED

The following references are of record in the file of this patent:

UNITED STATES PATENTS

| Number | Name | Date |
|---|---|---|
| 274,351 | Main | Mar. 20, 1883 |
| 795,808 | Armitage et al. | Aug. 1, 1905 |
| 1,296,042 | Bralone | Mar. 4, 1919 |
| 1,315,578 | Rock | Sept. 9, 1919 |
| 1,405,001 | Reichelt | Jan. 31, 1922 |
| 1,432,581 | Walker et al. | Oct. 17, 1922 |
| 1,438,486 | Gorman | Dec. 12, 1922 |
| 1,618,254 | Wilson | Feb. 22, 1927 |
| 1,985,370 | Hand | Dec. 25, 1934 |
| 2,260,770 | Brownlee | Oct. 28, 1941 |
| 2,332,743 | Morris | Oct. 26, 1943 |